(12) United States Patent
Borer et al.

(10) Patent No.: US 11,381,069 B2
(45) Date of Patent: Jul. 5, 2022

(54) DISTRIBUTION CABLING TAPE, SYSTEM AND TAPE APPLICATION DEVICE

(71) Applicant: CORNING RESEARCH & DEVELOPMENT CORPORATION, Corning, NY (US)

(72) Inventors: Victor Julian Borer, Austin, TX (US); David Montalion Dupuis, Cedar Park, TX (US); Cary Alan Kipke, Austin, TX (US); John Patrick Lammers, Austin, TX (US); Donald Kent Larson, Cedar Park, TX (US); Zachary Michael Thompson, Austin, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 59 days.

(21) Appl. No.: 16/835,593

(22) Filed: Mar. 31, 2020

(65) Prior Publication Data

US 2020/0227904 A1 Jul. 16, 2020

Related U.S. Application Data

(63) Continuation of application No. PCT/US2018/054107, filed on Oct. 3, 2018.
(Continued)

(51) Int. Cl.
*H02G 9/02* (2006.01)
*C09J 7/29* (2018.01)

(52) U.S. Cl.
CPC .............. *H02G 9/025* (2013.01); *C09J 7/29* (2018.01); *C09J 2203/302* (2013.01);
(Continued)

(58) Field of Classification Search
CPC .......... H02G 9/025; H02G 3/04; H02G 3/305; H02G 1/06; C09J 7/29; C09J 2203/302;
(Continued)

(56) References Cited

U.S. PATENT DOCUMENTS

| 4,117,192 A | 9/1978 | Jorgensen |
| 4,129,673 A | 12/1978 | Eigenmann |

(Continued)

FOREIGN PATENT DOCUMENTS

| EP | 0644557 A2 | 3/1995 |
| FR | 2754551 A1 | 4/1998 |

(Continued)

OTHER PUBLICATIONS

International Search Report and Written Opinion of the International Searching Authority; PCT/US2019/062226; dated Jan. 23, 2020; 11 pages; European Patent Office.
(Continued)

*Primary Examiner* — Patricia L. Nordmeyer
(74) *Attorney, Agent, or Firm* — William D. Doyle

(57) ABSTRACT

A distribution cabling tape system comprises a resilient polymeric base sheet having a first major surface and a second major surface, the first major surface being substantially continuous across a side to side width, an adhesive layer disposed on the first major surface, the adhesive layer capable of adhering to a concrete or asphalt surface, and first and second spacer layers arranged in a spaced apart configuration on the adhesive layer to form a continuous lengthwise channel configured to receive at least a portion of at least one distribution cable, each of the first and second spacer layers comprising a second adhesive layer disposed thereon, the second adhesive capable of adhering to a concrete or asphalt surface.

18 Claims, 8 Drawing Sheets

Related U.S. Application Data

(60) Provisional application No. 62/567,516, filed on Oct. 3, 2017.

(52) U.S. Cl.
CPC .... *C09J 2301/122* (2020.08); *C09J 2301/162* (2020.08); *C09J 2301/302* (2020.08); *Y10T 428/14* (2015.01)

(58) Field of Classification Search
CPC ............ C09J 2301/122; C09J 2301/162; C09J 2301/302; Y10T 428/14; Y10T 156/1788; Y10T 156/1795; G02B 6/46; G02B 6/4459; G02B 6/4466; B65H 35/004; B65H 2701/32
See application file for complete search history.

(56) References Cited

U.S. PATENT DOCUMENTS

| | | | |
|---|---|---|---|
| 4,282,281 A | 8/1981 | Ethen | |
| 4,388,359 A | 6/1983 | Ethen et al. | |
| 4,490,432 A | 12/1984 | Jordan | |
| 4,685,824 A | 8/1987 | Eigenmann | |
| 4,911,525 A | 3/1990 | Hicks et al. | |
| 4,988,541 A | 1/1991 | Hedblom | |
| 5,077,117 A | 12/1991 | Harper et al. | |
| 5,227,221 A | 7/1993 | Hedblom | |
| 5,468,159 A | 11/1995 | Brodsky et al. | |
| 5,593,246 A | 1/1997 | Hedblom et al. | |
| 5,683,746 A | 11/1997 | Hedblom et al. | |
| 5,763,000 A | 6/1998 | Hedblom | |
| 5,853,846 A | 12/1998 | Clark et al. | |
| 5,928,761 A | 7/1999 | Hedblom et al. | |
| 5,981,033 A | 11/1999 | Haunschild et al. | |
| 6,231,962 B1 | 5/2001 | Bries et al. | |
| 6,431,788 B1 | 8/2002 | Hedblom et al. | |
| 6,479,132 B2 | 11/2002 | Hedblom et al. | |
| 6,957,869 B1 | 10/2005 | Sawtelle | |
| 7,169,831 B2 | 1/2007 | Helland et al. | |
| 8,842,960 B2* | 9/2014 | Berglund | G02B 6/4495 385/136 |
| 9,164,251 B2 | 10/2015 | Dickinson et al. | |
| 9,477,059 B2 | 10/2016 | Larson et al. | |
| 2012/0137510 A1 | 6/2012 | Thompson et al. | |
| 2013/0011198 A1 | 1/2013 | Pichler et al. | |
| 2013/0098557 A1 | 4/2013 | Takeuchi et al. | |
| 2014/0011911 A1 | 1/2014 | Hedblom | |
| 2014/0153893 A1* | 6/2014 | Berglund | G02B 6/4495 385/136 |
| 2014/0268541 A1 | 9/2014 | Coombs et al. | |
| 2015/0171609 A1 | 6/2015 | Larson et al. | |
| 2017/0045416 A1 | 2/2017 | Hansen et al. | |
| 2017/0268184 A1 | 9/2017 | Loomis et al. | |
| 2018/0017750 A1* | 1/2018 | Clatanoff | G02B 6/504 |

FOREIGN PATENT DOCUMENTS

| | | |
|---|---|---|
| JP | 2006-235029 A | 9/2006 |
| WO | 2018/017475 A1 | 1/2018 |

OTHER PUBLICATIONS

International Search Report and Written Opinion of the International Searching Authority; PCT/US18/54107; dated Jan. 11, 2019; ISA/US Commissioner for Patents.

Electridut Inc: "UT Wire 5 1 Cable Blanket 4-6,8 Low Profile Cord Cover and Protector, Black", Available at: https://www.amazon.com/UT-WireUTW-CPL5-BK-BlanketProtector/dp/B075726R89?th=1, Retrieved on Jul. 1, 2021, 10 pages.

European Patent Application No. 18864723.4, Extended European Search Report dated Jul. 12, 2021; 10 pages; European Patent Office.

* cited by examiner

DISTRIBUTION CABLING TAPE, SYSTEM AND TAPE APPLICATION DEVICE

PRIORITY APPLICATION

This application is a continuation of International Application No. PCT/US2018/054107 filed on Oct. 3, 2018, which claims the benefit of U.S. Provisional Application No. 62/567,516, filed on Oct. 3, 2017, the content of which is relied upon and incorporated herein by reference in its entirety.

BACKGROUND

Field of the Invention

The present disclosure is directed to a distribution cabling tape or protective adhesive-backed structure and system for an asphalt or concrete surface, such as a road, curb, or walkway, that protects cabling, wires, splices, and other telecommunications network devices. The present disclosure is also directed to an applicator device or tool for applying the distribution cabling tape in a straightforward manner.

Related Art

Communications service providers are faced with increasing demands to deliver faster and better service to their customers. Service providers can meet these needs for greater bandwidth by incorporating fiber optics in the access network, the communication connection to the end subscriber. Service providers have announced gigabit service offerings.

With many players competing in the industry, speed to build new networks is critical. However, the process to deploy traditional fiber optic networks often requires time consuming civil engineering work both in planning, verifying existing infrastructure location and construction. The access network can be the most burdensome in that individual fibers must connect each subscriber's living unit. In the case of single family home neighborhoods, that means a single fiber to each home.

For aerial deployments (telephone poles), deploying the fiber optic cable is relatively straight forward. Lashing the new fiber optic distribution cable to existing telephone cabling or stringing a new messenger wire in which to lash the new fiber optic cable is done relatively quickly (about a day to install the distribution cable for a serving area of 200-500 homes). However, for new entrants for fiber-to-the-home (FTTh) service, gaining access to the telephone poles from the pole owner (often incumbent telephone company) can be a time consuming and litigious process.

For below grade deployments (conduit below grade in which to pull the distribution cable) deployment can involve many construction machines and operators for weeks for a serving area of 200-500 homes. One of the most time consuming operations is directional drilling to place the conduit below grade. The cost of directional drilling is approximately $40/foot making below grade fiber access network deployment cost much more than aerial deployments.

Therefore, need exists for a distribution cabling alternative to traditional aerial and below grade installations that can eliminate the need to share telephone poles and avoid the time consuming and costly directional drilling for conduit placement. According to one embodiment of the present disclosure, a distribution cabling tape system comprises a resilient polymeric base sheet having a first major surface and a second major surface, the first major surface being substantially continuous across a side to side width, an adhesive layer disposed on the first major surface, the adhesive layer capable of adhering to a concrete or asphalt surface, and first and second spacer layers arranged in a spaced apart configuration on the adhesive layer to form a continuous lengthwise channel configured to receive at least a portion of at least one distribution cable, each of the first and second spacer layers comprising a second adhesive layer disposed thereon, the second adhesive capable of adhering to a concrete or asphalt surface.

SUMMARY

According to another embodiment of the invention, a device for applying a distribution cabling tape system that includes a distribution cabling tape having an adhesive capable of adhering to a concrete or asphalt surface and a distribution cable, comprises a tape housing and distribution portion housing an amount of distribution cabling tape having at least one adhesive surface and a distribution cable housing and distribution portion that houses a spool of distribution cable, wherein movement of the device in a direction simultaneously applies both the distribution cable and the distribution cabling tape in a single pass.

The above summary of the present disclosure is not intended to describe each illustrated embodiment or every implementation of the present invention. The figures and the detailed description that follows more particularly exemplify these embodiments.

BRIEF DESCRIPTION OF THE DRAWINGS

The present disclosure will be further described with reference to the accompanying drawings, wherein.

Figure 1A:
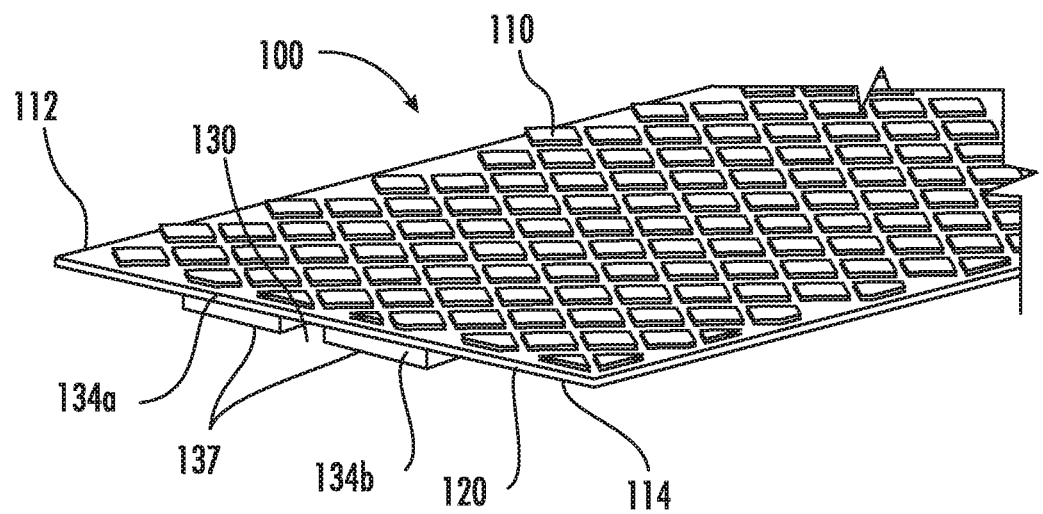
FIGS. 1A-1C are isometric views of a distribution cabling tape system according to various aspects of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure.

The present disclosure is directed to a durable, protective distribution cabling tape that includes or covers a conduit for distribution cable, such as fiber optic network cable. The distribution cabling tape system is configured to adhere to an asphalt or concrete surface, such as a road, curb, walkway, bridge support, building base or other foundation. In addition, the present disclosure is directed to a device for applying the distribution cabling tape system.

Figure 1B:
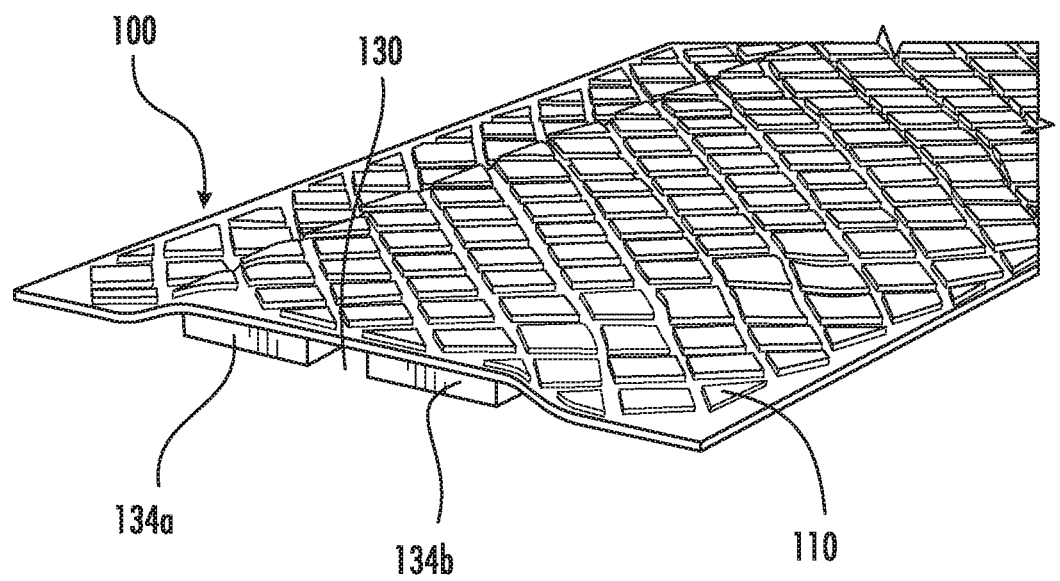
Figure 1C:
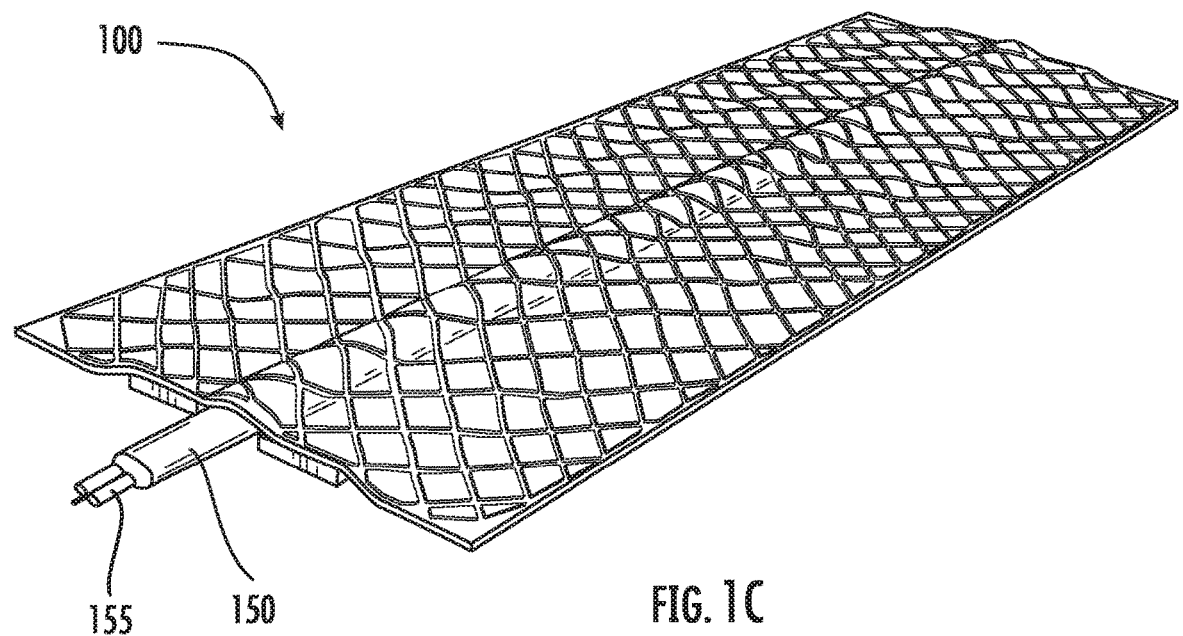
Figure 1D:
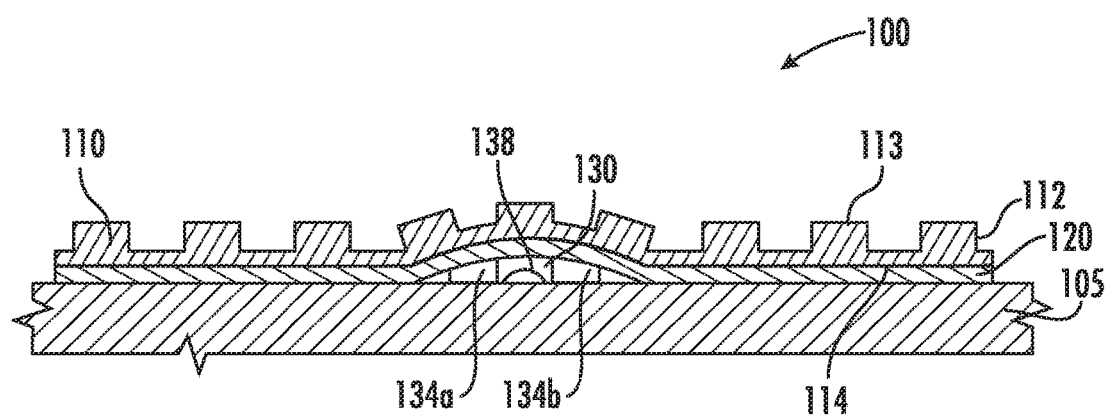
FIG. 1D is a cross section view of a distribution cabling tape system according to various aspects of the disclosure.

FIG. 1A shows a first aspect of the disclosure, a distribution cabling tape 100 that includes a durable, resilient polymeric base sheet 110 having a first major surface 114 and a second major surface 112. Other views of tape 100 are shown in FIGS. 1B-1D. Second major surface 112 can be a flat surface, or, as shown, it may comprise a patterned surface having a plurality of raised structures 113. Tape 100 includes a continuous lengthwise channel 130 that is formed between two lengthwise extending spacer layers 134a, 134b. The two spacer layers 134a, 134b can be formed from the same material as the durable, resilient polymeric base sheet 110, or they can be formed from a different material. The channel 130 is configured to receive at least a portion of a distribution cable, such as cable 150 shown in FIG. 1C. While a single channel 130 is shown in FIG. 1A, in other aspects of the disclosure, a distribution cabling tape system can include multiple channels.

The base sheet 110 is preferably made of a durable construction to withstand continual impacts made by vehicles and/or pedestrians. Acceptable base sheet compositions have been described in, for example, U.S. Pat. Nos. 4,117,192, 4,490,432, 4,282,281, US 2014/0011911, and U.S. Pat. No. 5,853,846, each of which is incorporated by reference herein in its entirety. In one aspect, the base sheet can comprise a thermoplastic material. In some other aspects, the base sheet can comprise a more conformable material, such that when the distribution cable is inserted in a channel, the channel can conform about an outer shape or profile of the distribution cable, for example, after the distribution cable is inserted in the channel, or after the distribution cable is installed on the road surface. In a further alternative aspect, the base sheet can comprise a fabric material, or a scrim, such as is described in U.S. Pat. Nos. 7,169,831 and 5,981,033, each of which is incorporated by reference herein in its entirety, which can make the distribution cabling tape removable in a straightforward manner, which can be useful in temporary deployment applications, such as for short duration events or in repair applications. In addition, as mentioned above, the base sheet can also comprise a composite of different materials, such as different polymeric materials. For example, a composite base sheet can be formed by coextruding two different polymers, such as a toughened or semi-rigid polymer material and a more flexible elastomeric (lower modulus) material.

In addition, tape 100 includes an adhesive layer 120 disposed on first major surface 114. In one aspect, the adhesive layer 120 comprises a composition that is capable of adhering to a concrete or asphalt (or asphalt-concrete hybrid) surface, such as a road, curb or walkway surface, such as road 105. In some aspects, the channel 130 is adhesive free. In other aspects, the channel 130 may include some amount of adhesive in it to help hold the distribution cable in place during deployment. In another aspect, the adhesive layer 120 can comprise a composition that is capable of adhering to an alternative road surface, such as a cobblestone or brick surface.

Referring to FIGS. 1A-1D, each of the two spacer layers 134a, 134b can also include an additional adhesive layer 137 disposed on a road facing surface thereon. This adhesive layer 137 can be the same or different from adhesive layer 120. Moreover, the distribution cabling tape 100 can further include an additional thin layer of adhesive or adhesive film 138 (see the cross section view of tape 100 in FIG. 1D) that can be applied to the entirety of the road facing surface of the tape.

In another aspect, although not shown, the tape 100 can further include a release liner disposed on the adhesive coated side of the tape. The release liner can be removed during application to a road or other surface.

In further detail, in one aspect, surface 114 of tape 100 can include a pressure sensitive adhesive (PSA) layer 120, having a thickness of from about 3 to 10 mil, preferably about 6 mil. The spacer layers 134a, 134b can be attached to layer 120. In this example, the spacer layers 134a, 134b comprise the same material as material 110 and also include a PSA layer 137 disposed on the lower (road facing) surface. The spacer layers 134a, 134b can have a width of about 0.5 to 2 inches and a thickness of from about 0.05 to about 0.5 inches.

It is noted that while structure 100 is referred to herein as a "tape" or "system," this term is not meant to exclude other types of adhesive-coated structures, such as adhesive-coated road patches, panels or markers that can provide a protective conduit or other type of pathway for cables. In addition, the distribution cabling tape can also provide a protective pathway for electrical or power lines that are to be distributed through a neighborhood, or across a road, curb, street, parking lot or sidewalk, or for cabling repairs and/or splices. Moreover, the adhesive can be selected to provide either a temporary or more permanent type of bond to the road, curb, or walkway, thus providing a distribution cabling solution for short term events (such as concerts, sporting events, festivals, and the like), or for more longer duration deployment situations (such as subdivisions in development). In addition, while the tape embodiments described herein are often used in road, curb, sidewalk, or street applications, in alternative embodiments, the distribution cabling tape can be used to distribute cabling along other surfaces, such as along or up the side of a building, tower, bridge, or other structures. Further, while cable 150 is described herein as a distribution cable, tape 100 can be used to route and/or protect many different types of cables, including communication cables, power cables (such as low voltage power cables), sensor wires, co-axial cables, signal cables, and other conventional cables, or other types of equipment, such as sensors, RFID tags, embedded antennas, antenna feeds, and location markers.

FIG. 1B shows another aspect of the disclosure, a distribution cabling tape 100, where distribution cabling tape 100 has been applied to a surface 105.

FIG. 1C shows another aspect of the disclosure, a distribution cabling tape system 100 that includes a distribution cable 150 disposed in channel 130. In this aspect, the distribution cable 150 includes one or more electrical lines or optical fibers 155. In some aspects, cable 150 can include one or more strength members such as is present in commercially available cable, such as 3M™ Clear Fiber Drop Cable (available from 3M Company, St. Paul Minn.), ROC™ Drop Dielectric Cable (available from Corning Inc., Hickory N.C.). Other suitable cables include CampusLink™ Indoor/Outdoor cable (available from Prysmian Group, Lexington, S.C.). Alternatively, in some aspects, the distribution cable 150 can comprise a conventional ribbon fiber having multiple fibers or a series of parallel optical fibers disposed on a filament tape to allow straightforward access to separate individual fibers by peeling off a portion of the filament tape. As such, the distribution cable 150 can have a circular, oval, or rectangular cross section profile. In other alternative embodiments, channel 130 can be configured to accommodate more than one distribution cable.

In an alternative embodiment, resilient polymeric base sheet 110 can be formed from a single material, or, alternatively, different materials. For example, a first portion of polymeric base sheet 110 can be formed from a first material, such as a toughened or semi-rigid polymer material and other portions can be formed from a different material, such as a more flexible elastomeric (lower modulus) material. Such a composite base sheet 110 can be formed by coextruding the two different polymers, as would be apparent to one of skill in the art given the present description.

As mentioned above, the second or top layer 112 of the base sheet 110, may be a flat surface or it may have a raised pattern surface of raised structures 113 (such as is shown in FIG. 1A). The base sheet 110 can be any color so that the tape can stand out (such as including white or yellow coloring) or it can blend into the surface upon which it is mounted (such as including gray or black coloring) or it can be covered with conventional road surfacing or resurfacing materials. Retroreflective elements, glass and/or ceramic beads, can be embedded directly on the second surface 112 as is described in U.S. Pat. No. 4,388,359, which is incorporated by reference in its entirety. Alternatively, the second surface 112 can be coated with either a thermoplastic or thermosetting layer. For flat markings, an example of a thermoplastic material is described in U.S. Pat. No. 4,117,192, which is incorporated by reference in its entirety, and for thermosetting an example material is described in U.S. Pat. No. 5,077,117, which is incorporated by reference in its entirety. For base sheets 110 having a plurality of raised protuberances, example materials are described in U.S. Pat. Nos. 4,988,541, 5,683,746, 5,593,246, 6,479,132, 5,928,761, 5,227,221, and 5,763,000, each of which is incorporated by reference in its entirety. Additionally, other patterns and designs of raised protuberances are described in U.S. Pat. Nos. 4,388,359, 4,988,541, 5,683,746, and 4,681,401, each of which is incorporated by reference in its entirety. For applications where roads may be subject to snow and ice accumulation, exemplary base sheets designed to resist the action of snowplow blades are described in U.S. Pat. Nos. 4,129,673, 4,685,824, and 6,431,788, each of which is incorporated by reference in its entirety. Exemplary commercially available pavement marking tapes include those sold under the Stamark™ brand, including 380 IES and 380 AW models, available from 3M Company, St. Paul Minn.

Acceptable methods of forming a tape structure using the exemplary base sheets and adhesives described herein can include hot embossing, double sided embossing, patterned nip rolls, doctor blading (for adhesives), and pattern coating techniques. For example, patterned embossing rolls can be brought into contact with opposing sides of a web of the base sheet material to generate the desired patterns on each side of the base sheet (e.g., diamonds on the air side (e.g., surface 112) and continuous channel on the road side (e.g., surface 114)). Doctor blades or pattern coating can be used to apply adhesives in non-channel areas.

Figure 2:
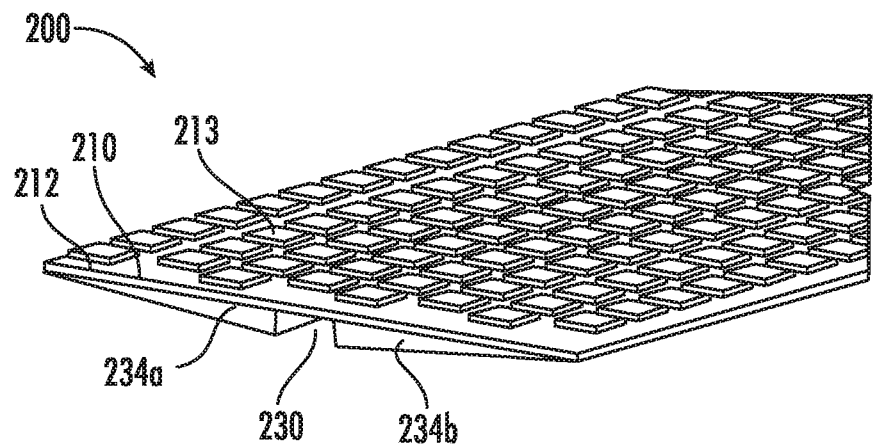
FIG. 2 is an isometric view of an adhesive backed road surface tape according to another aspect of the disclosure.

FIG. 2 shows another aspect of the disclosure, a distribution cabling tape 200 that includes a resilient polymeric base sheet 210 having a first major surface (not shown) and a second major surface 212 that comprises a patterned surface 213 having a plurality of raised structures. In this aspect, a distribution cable can be disposed in a continuous lengthwise channel 230 that is formed between two spacer layers 234a, 234b. The two spacer layers 234a, 234b can be formed from the same material as the durable, resilient polymeric base sheet 210, or they can be formed from a different material. The channel 230 is configured to receive at least a portion of a distribution cable, such as cable 150 shown in FIG. 1C. While a single channel 130 is shown in FIG. 2, in other aspects of the disclosure, a distribution cabling tape system can include multiple channels.

In this aspect, the thickness of each of the spacer layers 234a, 234b can be varying, e.g., providing a tapered shape, such as is shown in FIG. 2. In this example, the spacer layers 234a, 234b taper to a smaller thickness as the layers extend toward the tape edges.

In any of the embodiments herein, the mounting surface, such as a road, curb, or sidewalk, can include a groove or channel formed therein. Such a groove or channel, as well as different tape constructions, are described in U.S. patent application Ser. No. 15/651,557, incorporated by reference herein in its entirety. The groove or channel can be formed with a conventional road surface grinding tool, such as a Graco GrindLazer Model 630. In one example, the surface channel can have a width and depth of about ¼"-1" to receive a conventional fiber drop cable, such as the ROC™ Drop Dielectric Cable (available from Corning Inc., Hickory N.C.). In this aspect, the channel or pathway can have a width and depth sufficient to allow the distribution cable to "float" within the pathway as the road expands and contracts with daytime heating and seasonal temperature changes. In accordance with other aspects of the present disclosure, in lieu of or in addition to the channel or pathway discussed above, the roadway surface may also be milled to create a cavity that is of height approximately equal to or slightly larger than the thickness of the roadway tape and of width approximately equal to or slightly larger than the width of the roadway tape. As such, when the roadway tape is applied to the roadway, the roadway tape occupies the milled cavity in a manner that the roadway tape is recessed flush with the roadway surface and less vulnerable to impact from vehicles, snowplow blades, and other common roadway hazards.

Optionally, in addition to the distribution cable, in some aspects of the disclosure, a sealant or adhesive can be applied to the surface channel and/or tape cavity. For example, an added sealant can help prevent water build-up within the surface channel or cavity. An exemplary sealant can comprise, for example, Safetrack™ MTI sealant available from StirlingLloyd Polychem Ltd (UK). The adhesive layer and the base sheet 210 can be constructed as described above. Further, different sections of the road surface channel can be configured with a different shape, such as a wider channel or trench, so as to accommodate different types of network devices, such as splices or other equipment.

Figure 3A:
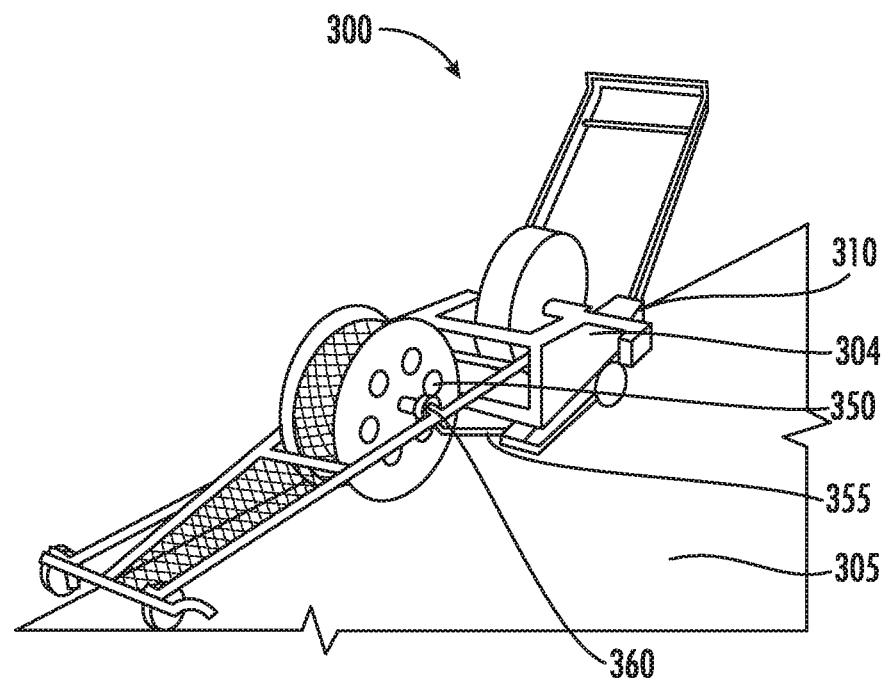
FIG. 3A is a view of a device for applying a distribution cabling tape system according to other aspects of the disclosure.

In another aspect of the disclosure, the distribution cabling tape system can be applied to a road, burb, sidewalk, or other surface using the applicator machine or device 300 shown in FIG. 3A. The device 300 includes a road tape housing and distribution portion 304 that houses a spool of distribution cabling tape, such as tape 100, shown above. It is noted that other suitable distribution cabling tape constructions, such as described in U.S. patent application Ser. No. 15/651,557, incorporated by reference above, can also be applied using device 300. One example road tape housing and distribution portion is commercially available from Century Tool, Inc. The device 300 also includes a distribution cable housing and distribution portion 350 that houses a spool of distribution cable, such as cable 150, shown above. In this example, the spool of distribution cable is mounted on a cable spool support rod 360. Device 300 also includes a mechanism, such as spring-loaded netting disposed across a top surface of the spool, to provide a constant force on the cable spool 350 so that distribution cable does not inadvertently deploy. Device 300 also includes a kick-stand mechanism that can lift the road tape housing and distribution portion 304 from the road surface 305 when additional cable needs to be pulled from spool 350 and deployed to a particular location, such as at a distribution hub. In addition, a cable application guide 355, such as a plate and wheel mechanism, can be disposed at or near the road tape housing and distribution portion 304 in order to guide the cable to the proper position with respect to the road tape being deployed. Device 300 can further include hand grip extensions to allow for easier device turning along roadway curves.

Figure 3B:
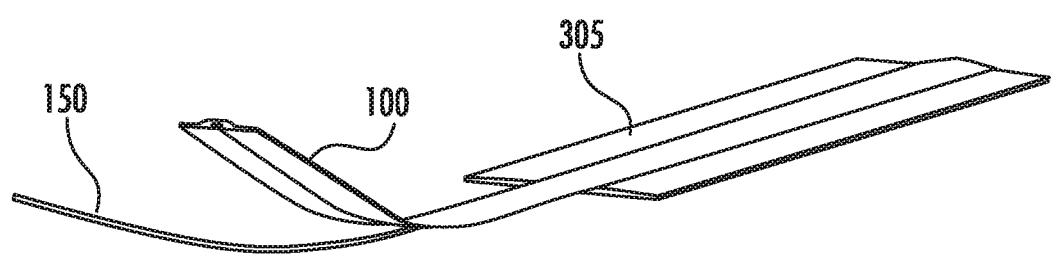
FIGS. 3B-3C are schematic views of a distribution cabling system being deployed according to other aspects of the disclosure.
Figure 3C:
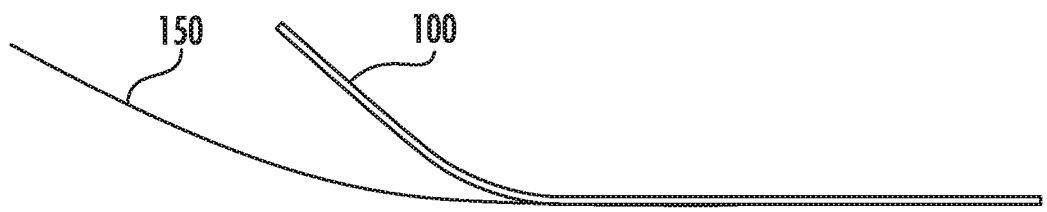

In one aspect of the disclosure, device 300 can simultaneously apply both distribution cable 150 and the road tape 100 in a single pass. This process is illustrated in FIGS. 3B and 3C, where the cable 150 is deployed forward of the tape 100 dispensing portion. The cable 150 can be guided in a precise manner, such as by feeding the cable 150 through the cable application guide 355. In this manner, the tape and cable can be laminated simultaneously to road surface 305, or the cable can be adhered to the tape surface or cable channel (e.g., channel 130, 230) just prior to the application of the tape/cable system to the road surface. By pushing the device 300 forward, a continuous cable and tape payout and lamination process can occur. In addition, device 300 can be configured with a single front wheel that helps allow for turning during the application process, so that a turning radius of about 6 feet can be achieved. In addition, device 300 can be manually operated using a manual pushing force or it can be a motor assisted or driven device.

The distribution cabling tape and application system thus allows a service provider the opportunity to quickly connect a sufficient number of customers in a neighborhood or building before making a large infrastructure investment. In this manner, each of the houses in this area of the neighborhood can be rapidly accessed without having to utilize directional drilling or other massive road destruction and repair procedures.

Figure 4:
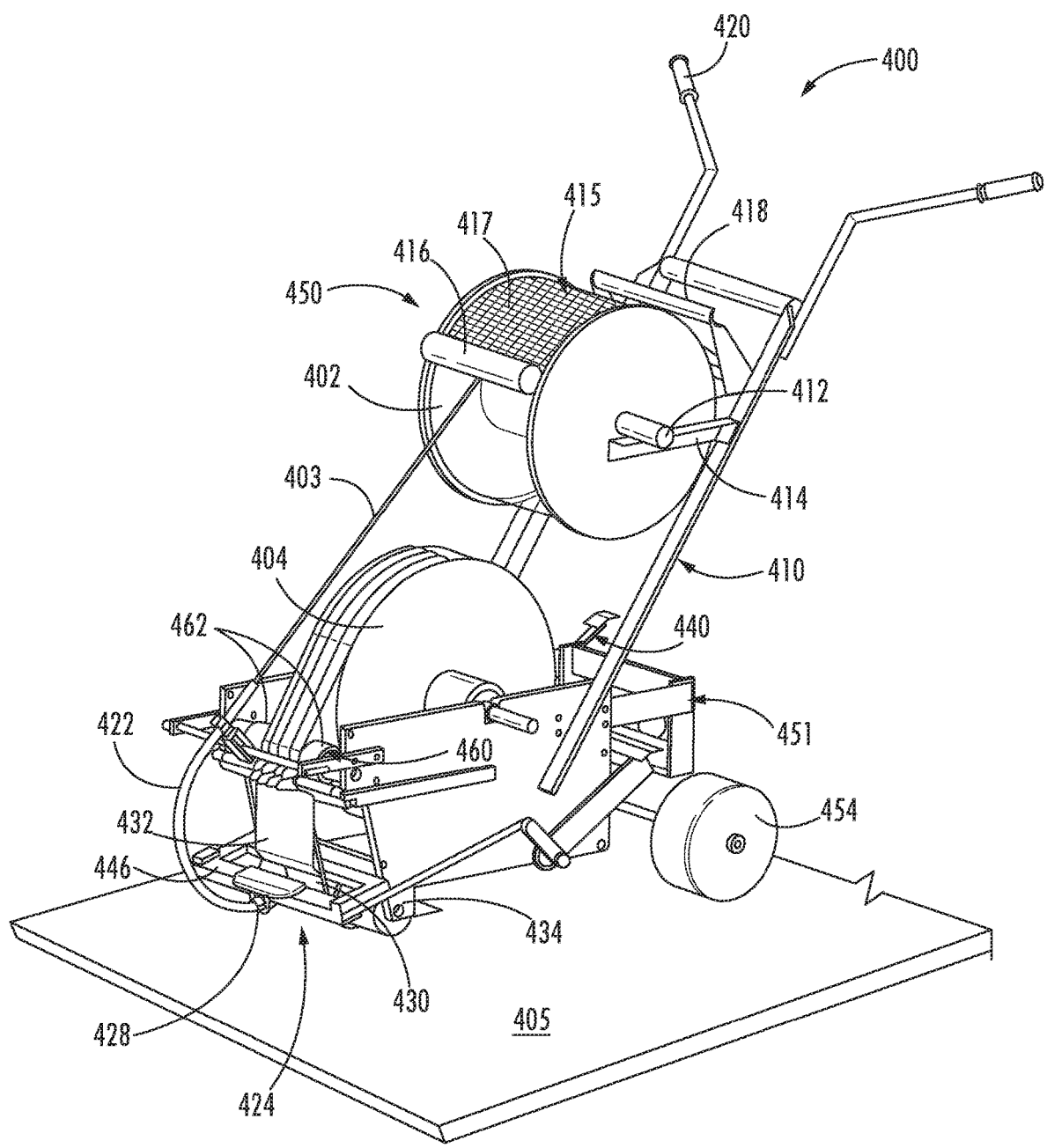
FIG. 4 is a view of another device for applying a distribution cabling tape system in accordance with aspects of the disclosure.

In another aspect of the disclosure, the distribution cabling tape system can be applied to a road, burb, sidewalk, or other surface 405 using the applicator machine or device 400 shown in FIG. 4. The device 400 includes a road tape housing and distribution portion 404 that houses a spool of distribution cabling tape 430, which may be similar or the same as tape 100, disclosed above. The device 400 also includes a distribution cable housing and distribution portion 450 that houses a spool of cable 402, which may preferably provide a predetermined length of an optical fiber cable 403, for example.

In this example, the spool of cable 402 may be mounted onto frame 410 by a cable spool support rod 412 removably supported by arms 414 and low friction bushings (not shown). Spools of cable 402 of about 2000 feet or more may be easily mounted onto the device 400. By locating the spool of cable 402 on frame 410 above the road tape housing and distribution portion 404, the footprint of the device 400 may be more compact than if the spool of cable 402 and road tape housing and distribution portion 404 are situated horizontally one behind the other.

In accordance with other aspects of the disclosure, the cable 403 may be fed to device 400 from a separate storage location or apparatus. For example, a separate spool holder (not shown), which for example may be a cart or trailer, may be attached to the device 400 or incorporated into or attached to the motorized attachment 452 (see, e.g., FIG. 9) to supply longer lengths of cable 403 than can be effectively held by the device 400. Other aspects may include laying the cable ahead of device 400, wherein the cable 403 is fed to the device 400 from forward of the device 400. Serpentine rollers or any other suitable guide mechanisms to feed the cable toward the cable placement area 424 may be provided on the frame 410.

Device 400 also includes a cable holding mechanism 415, such as a weight bar 416 and plastic mesh 417, which may be a spring-loaded netting, for example. The distribution or drop cable 403 may be stiff or shape-conformed due to spooling, which may snag if not maintained in position with compression and/or tension. Accordingly, the cable holding mechanism 415 provides a mean of maintaining a relative position of the cable 403 during unspooling to provide a constant force on the cable 403 so that distribution cable does not inadvertently deploy. The frame 410 may include a holding mechanism support 418. The weight bar 416 and mesh 417 may be lifted and moved to a location supported by the holding mechanism support 418 to allow for rapid spool 402 changes.

Handle bars 420 may be incorporated into the frame 410 or separately provided to attach to the frame 410. Handle bars 420 may extend outward at an angle, such as about 45°, to provide greater leverage to an operator to turn and steer the machine, avoiding operator fatigue. In addition, the positioning and angle of the handle bars 420 are such that during operation when the device 400 is attached to a motorized guide vehicle, the ergonomics of the handle bars ensure the operator may remain seated comfortably and operate the device 400 without strain or discomfort.

Figure 5:
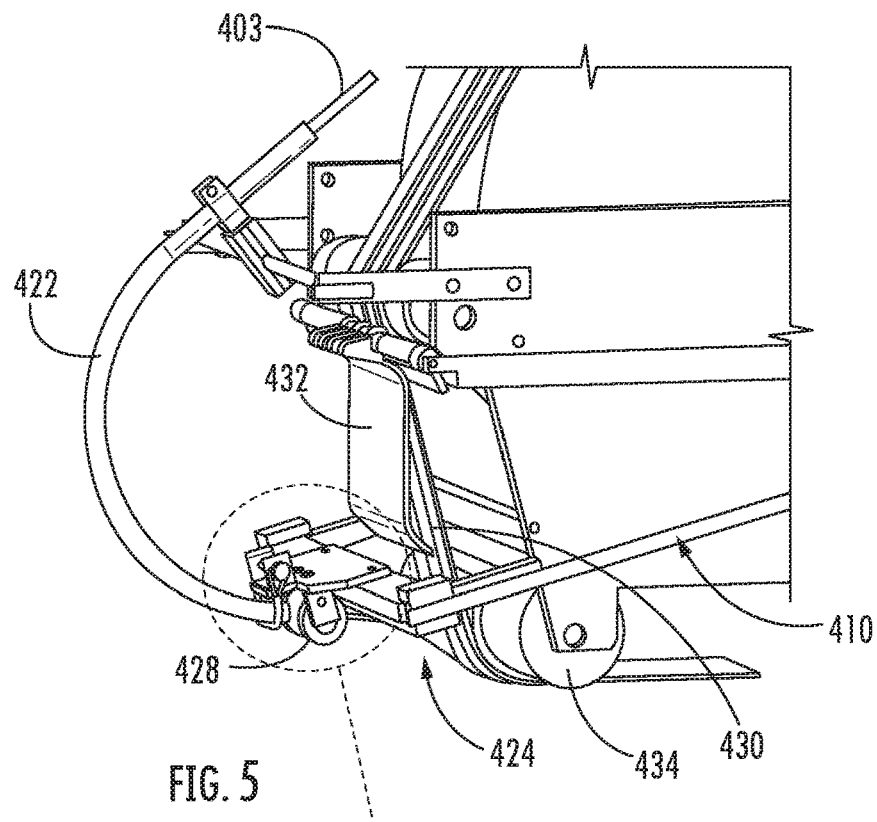
FIG. 5 is a sectional view of a front portion of the device shown in FIG. 4.
Figure 6:
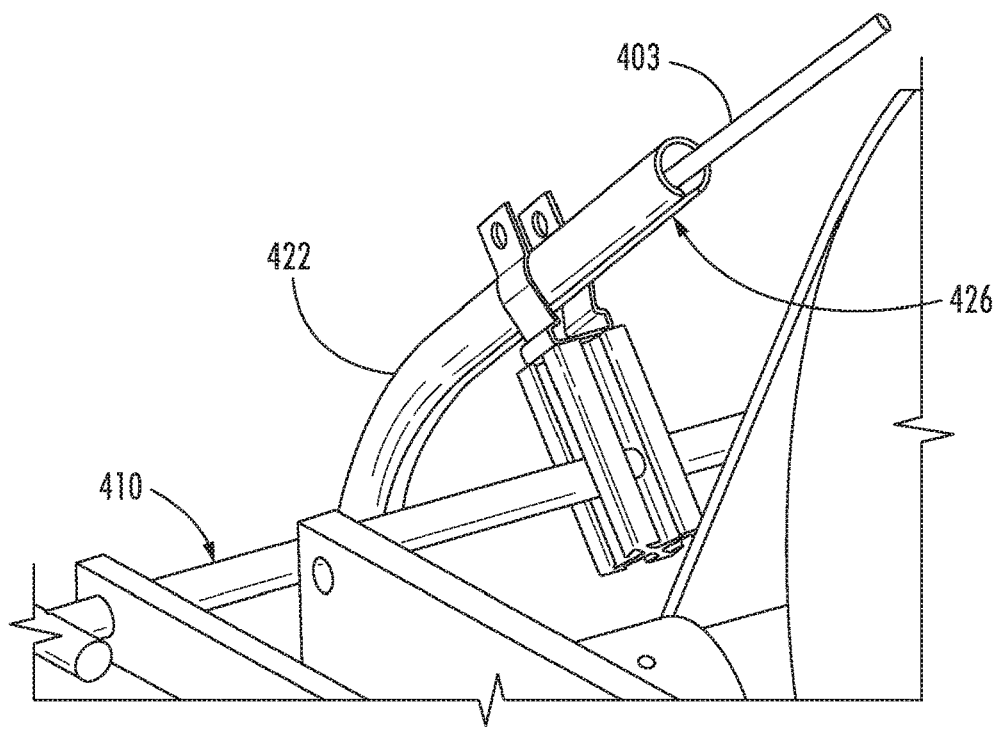
FIG. 6 is a close-up sectional view of aspects of the device shown in FIG. 4, including a cable guide, in accordance with aspects of the disclosure.

As shown in FIGS. 4 through 6, the distribution cable 403 may be fed from the spool 402 into a cable guide 422 to change the direction of the cable with low friction as the cable 403 is paid out from the cable spool 402 toward a cable placement area 424. The cable guide 422 may be a tube, for example, made of metal, a hard polymer, or any other suitable material that is removably attached to the frame 410. The cable guide 422 constrains and guides the cable 403 for efficient and consistent placement toward the cable placement area 424. As shown in FIG. 6, the cable guide 422 may be formed to include a longitudinal gap 426 that allows the cable to be removed from the device 400 without having to cut the cable 403 to do so. Although shown with the longitudinal gap 426 provided on an inner radial surface of the cable guide 422, the longitudinal gap 426 may be provided longitudinal along any side of the cable guide 422, such as the radial outer surface of the cable guide 422 or either longitudinal side surface of the cable guide 422. Particularly at transition from road surface tape 430 to a drop cable burial, for example, it is desirable to remove the cable spool 402 from the machine without cutting the cable 403. The longitudinal gap 426 allows the cable 403 to be removed from the device 400 without having to cut the cable. In this regard, the cable 403 may be removed from device 400 and a slack amount of cable 403 for a drop, for example, may be run off of the spool 402 being a cut is made in the cable.

Figure 5A:
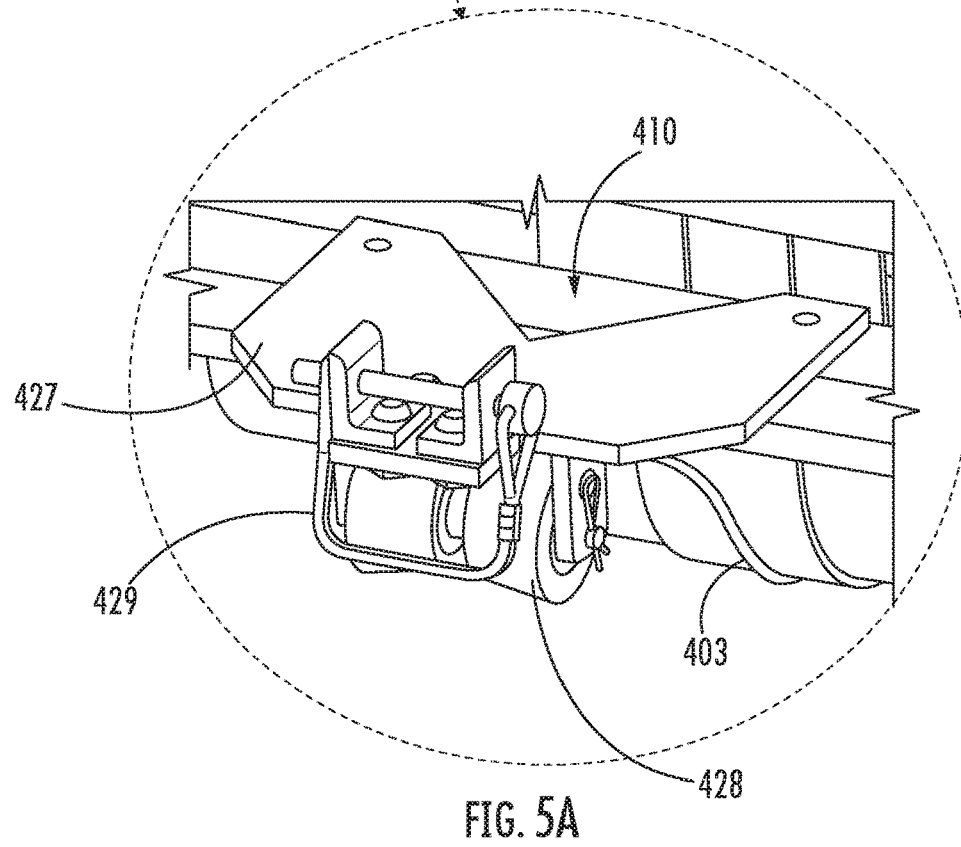
FIG. 5A is a close-up view of cable guide components in accordance with aspects of the disclosure.

A guide roller 428 may be provided to further direct the cable 403 efficiently toward the cable placement area 424 once the cable exits the cable guide 422. In accordance with yet other aspects of the present disclosure, as shown in the close-up of FIG. 5A, a front guide plate 427 may be incorporated into or attached to the frame 410 to support the guide roller 428 and further assist in directing the cable 403 toward the cable placement area 424. As shown in FIG. 5A, the guide roller 428 may be removable and may comprise two compressible roller portions and a central slot for guiding the cable, or may be formed of a single body portion containing a central groove or valley for guiding the cable 403 toward the cable placement area 424. Different guide rollers 428, for example, with different sized slots or valleys, may be used to accommodate different sized cables. A removable arm bar 429 may be mounted onto the front guide plate to further constrain and guide the cable 403 toward the cable placement area 424.

As shown in FIGS. 4 and 5, the cable 403 may be directed either toward the road surface 405 or directly onto the tape 430. The cable 403 may thus be accurately placed onto the road or directly onto the tape such that the cable 403 situates into the center channel of the road tape 430, including in situations wherein the device 400 is making radius turns on the surface 405 as low as 10 feet. This allows efficient placement of the distribution cable 400 and road tape 430 around street corners or road obstacles such as manhole covers, for example, without having to stop or reset the device 400.

In accordance with other aspects of the disclosure, a tape feed mechanism 432 may be provided that is integral with or attached to a leading edge of the road tape housing and distribution portion 404. The tape feed mechanism 432 may be retractable such that when loading a new tape reel, or when a cut has been made in the tape 430, the tape feed mechanism 432 may be extended to allow the tape 430 to be pulled from a forward exit portion of the road tape housing and distribution portion 404 without the adhesive from the tape sticking to or gumming up aspects of the road tape housing and distribution portion 404, the frame 410, or other components of the device 400 until the end portion of the tape 430 is attached to the road surface 405. The tape feed mechanism 432 may be provided with a low friction coating, such as Teflon or some other suitable material, for example, to provide the necessary protection without the tape sticking to the tape feed mechanism. In accordance with yet other aspects of the present disclosure, the tape feed mechanism 432 may be provided with a coating or other mechanical means to provide a controlled bond to the tape 430, such that the tape feed mechanism 432 may be attached at or toward a distal end or tongue portion of the tape 430 where the distal end or tongue portion of the tape 430 exits the road tape housing and distribution portion 404. The tape may be extended from the road tape housing and distribution portion 404 until the tape 430 is positioned for attachment to the road surface 405 just prior to the primary roller 434. Upon proper positioning, the tape feed mechanism 432 may be released or detached from the end of the tape 430 and the end of the tape attached to the road surface 405. Once the end of the tape 430 is attached to the road surface 405, the tape feed mechanism 432 may be retracted or stored separated from the tape 430 now traversing past the tape feed mechanism 432 as the cable 403 and tape 430 are paid out.

Figure 7:
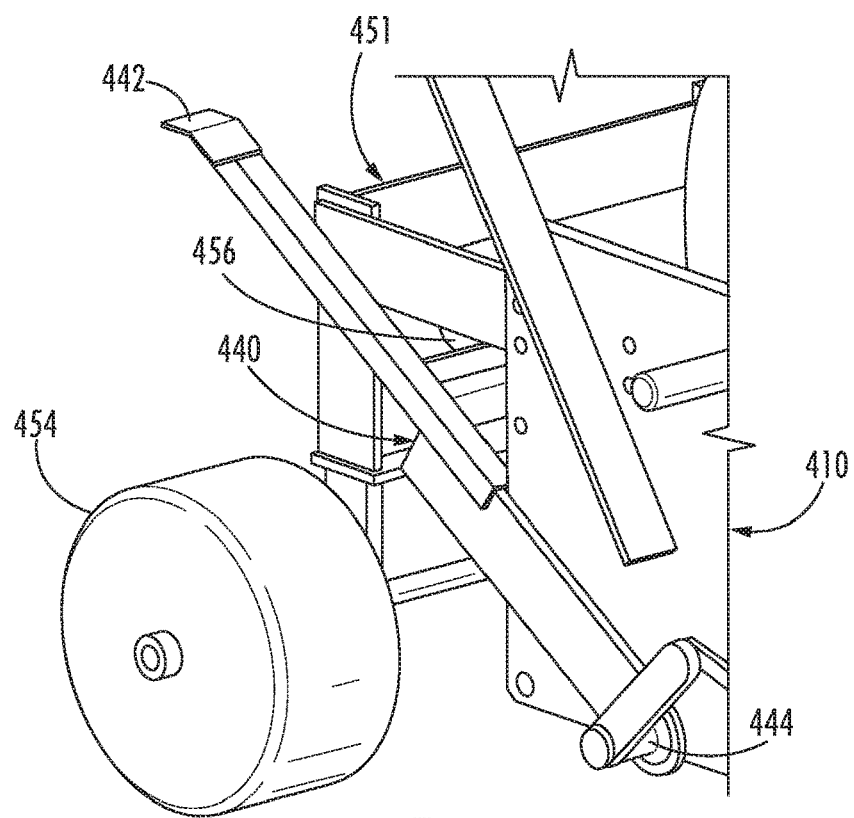
FIG. 7 is a close-up sectional view of more aspects of the device shown in FIG. 4, including a cut apparatus, in accordance with aspects of the disclosure.

As shown in FIG. 4 and closeup in FIG. 7, the device 400 may be provided with a cut apparatus 440 that extends from the frame 410 toward the rear of the device 400. The cut apparatus 440 is situated to a side of a motorized attachment frame 451 provided toward a rear portion of the device 400. Thus, when a motorized attachment 452 (see FIG. 9), such as Graco Line Driver HD Model 262005, is used with the device 400, the cut arm apparatus 440 clears the motorized attachment 452. The cut apparatus 440 includes a cut arm 440 attached to a linkage system 444. The cut arm 442 is cantilevered toward the rear of the device 400 such that an operator walking behind or an operator of the motorized attachment 452 attached to the device 400 can easily apply pressure with a foot, for example, to the cut arm 442. The cut arm 442 will in turn operate a cut blade 446 (see FIG. 4) through the linkage system 444 that cuts the tape 430 when desired.

Figure 8:
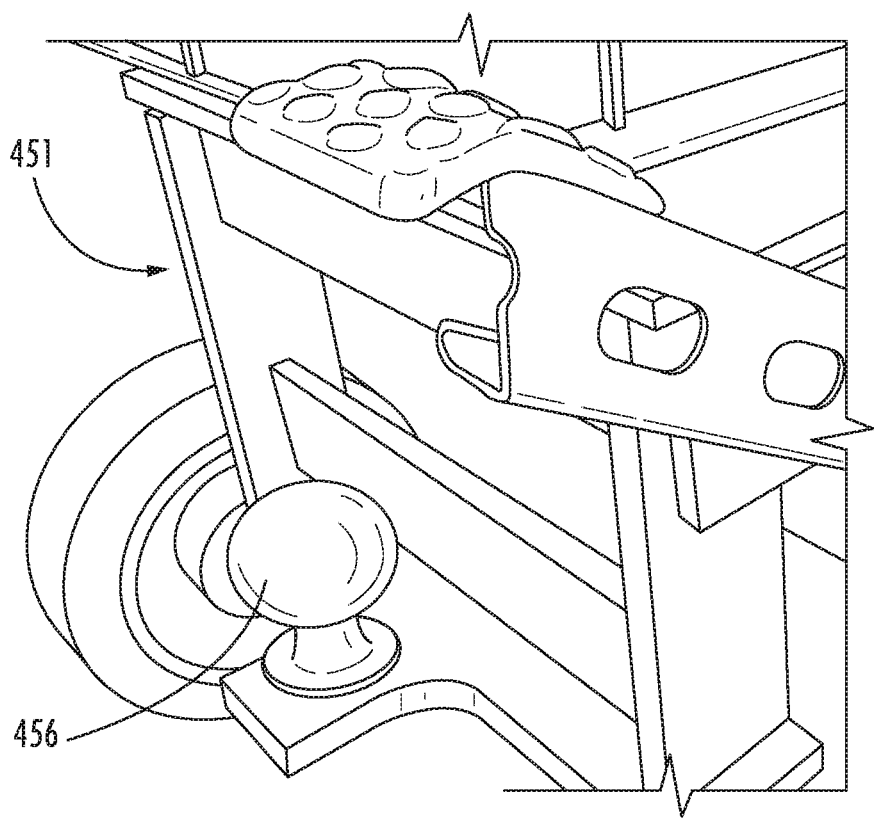
FIG. 8 is a close-up sectional view of aspects of the device shown in FIG. 4, including a hitch component, in accordance with aspects of the disclosure.

In accordance with yet other aspects of the present disclosure, as shown in FIGS. 7 and 8, the device 400 may include wheels 454 mounted on the attachment frame 451. Combined with the primary roller 434, the device 400 is mobile during simultaneous application of the distribution cable 403 and the roadway tape 430. The device 400 is weighted such that the primary roller 434 applies pressure to the roadway tape 430 to bond to the roadway tape 430 to the road surface 405 during application. A secondary weight component may be used to further compress the roadway tape 430 into the road surface 405 following application by the device 400. As shown in FIG. 4, a tape roll idler 460 having integrated tape edge guides 462 may be mounted onto the frame 410. The tape edge guides 462 have an outside diameter that ensures the tape 430 is properly situated between the guides 462 does not jump or substantially move during installation.

Figure 9:
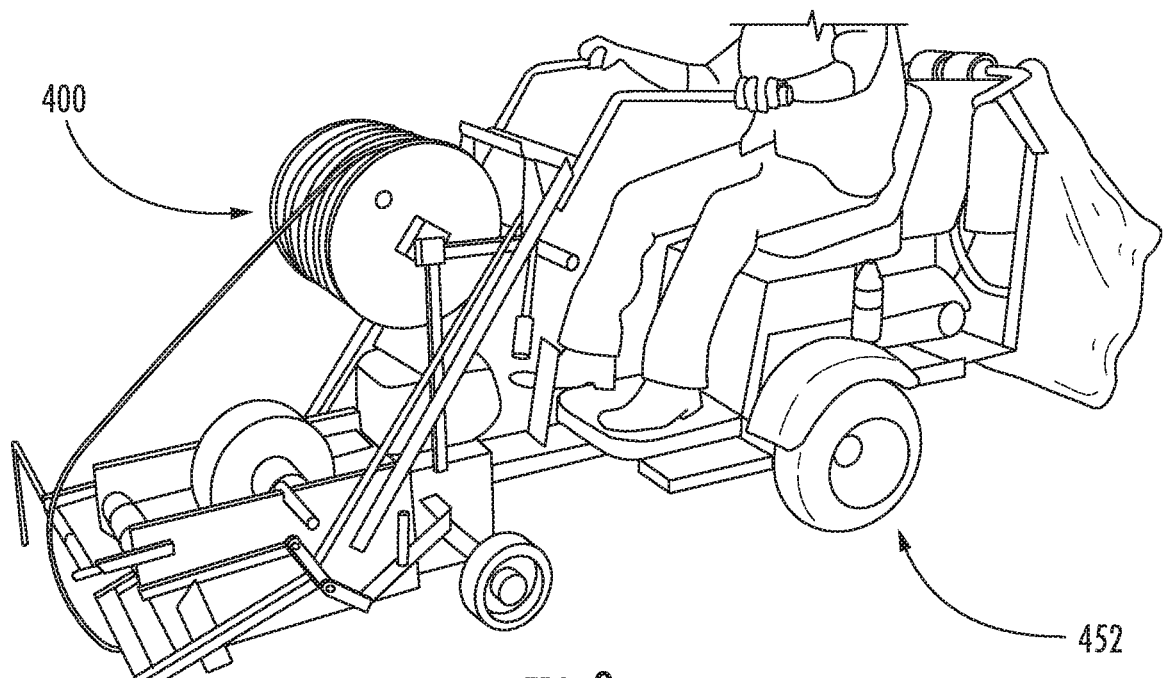
FIG. 9 is a view of the device shown in FIG. 4 and a motorized attachment in accordance with aspects of the disclosure.

As also shown in FIGS. 7 and 8, a hitch component 456 may be integral with or attached to the attachment frame 451 such that the motorized attachment 452 shown in FIG. 9 may be easily attached to and used with the device 400. The device 400 may thus be pushed by the motorized attachment 452 to reduce or eliminate operator fatigue. Moreover, due to the weight and friction of the device 400 while placing tape 430 and cable 403, considerable axial force is required to move the device 400 forward during operation. Particularly where longer applications are required, use of the motorized attachment 452 may be desirable.

As discussed infra, a secondary weight component, such as a tamper roller may be integrated into the device 400 and/or the motorized attachment 452 to ensure proper tack build of the tape 430 to the roadway surface 405. This can prevent having to employ a secondary tamping operation resulting in installation and labor cost savings. In addition, storage for additional tape rolls may be provided either on the device 400 or the motorized attachment 452. A standard length of a roll of road tape may be approximately 35 yards or 100 feet. Accordingly, a new roll of road tape may be necessary every few minutes during an installation run. Storage of additional rolls on either the device 400 or the motorized attachment 452 may require fewer trips to the supply location and provide additional savings on installation and labor cost. A mount for a gas-powered leaf blower, for example, or a permanently installed blower, may also be provided on the device 400. Integrating a blower directly to the front of the device 400 improves the productivity of an installation crew and reduces opportunities for debris to get between the tape and the roadway surface.

Other applications for the tape constructions described herein can also be implemented. For example, the adhesive backed structure or tape can be configured to further ruggedize drop cable for direct buried applications. The tape can continue off the road and can be wrapped around the drop cable making a robust transition from the road surface to below grade bury of the cable and continuing all the way to the house if deemed necessary. In addition, the road surface conduit can be deployed on a curb adjacent to the street thereby eliminating network disruption when the street is resurfaced. The road surface conduit can be deployed with pre-fabricated distribution cable assemblies (e.g., FlexNap, available from Corning, Inc.) where the access branch point is accommodated in the road surface. An alternative deployment technique can include utilizing a RetractaNet™ cable (available from Prysmian Group, Lexington, S.C.) and one or more window cuts to access one or more of the individual communication lines therein. In addition, the distribution cabling tape embodiments described herein can be used to distribute cabling along other surfaces, such as along or up the side of a building, tower, bridge, or other structures.

While a preferred application of the distribution cabling tape is for telecommunication applications, as mentioned previously, other applications can include pathways for power, sensors or sensing or electronics for smart road applications.

Various modifications, equivalent processes, as well as numerous structures to which the present disclosure may be applicable will be readily apparent to those of skill in the art to which the present disclosure is directed upon review of the present specification.

We claim:

1. A distribution cabling tape system, comprising:
    a resilient polymeric base sheet having a first major surface and a second major surface, the first major surface being substantially continuous across a side to side width;
    an adhesive layer disposed on the first major surface, the adhesive layer capable of adhering to a concrete or asphalt surface; and
    first and second spacer layers arranged in a spaced apart configuration on the adhesive layer to form a continuous lengthwise channel configured to receive at least a portion of at least one distribution cable, each of the first and second spacer layers comprising a second adhesive layer disposed thereon, the second adhesive capable of adhering to a concrete or asphalt surface.

2. The distribution cabling tape system of claim 1, wherein the spacer layers and polymeric base sheet are formed from the same material.

3. The distribution cabling tape system of claim 1, wherein each spacer layer has a width of between 0.5 and 2 inches and a thickness of from about 0.05 to about 0.5 inches.

4. The distribution cabling tape system of claim 1, further comprising a release liner.

5. The distribution cabling tape system of claim 1, wherein each of the first and second spacers layers has a tapered cross sectional shape.

6. The distribution cabling tape system of claim 1, wherein each of the spacer layers has a variable thickness.

7. The distribution cabling tape system of claim 1, further comprising a thin adhesive or film layer continuously applied across the road facing surface and channel.

8. The distribution cabling tape system of claim 1, wherein the second major surface comprises a patterned surface having a plurality of raised structures.

9. The distribution cabling tape system of claim 1, wherein the adhesive layer comprises a pressure sensitive adhesive.

10. The distribution cabling tape system of claim 1, wherein the polymeric base sheet comprises a non-crosslinked elastomer precursor.

11. The distribution cabling tape system of claim 1, wherein the distribution cable comprises an optical fiber.

12. The distribution cabling tape system of claim 1, wherein the distribution cable comprises an optical fiber bundle.

13. The distribution cabling tape system of claim 1, wherein the adhesive layer provides a substantially permanent bond to the concrete or asphalt surface.

14. The distribution cabling tape system of claim 1, wherein a width of the first and second spacer layers and the continuous lengthwise channel is less than the side to side width of the polymeric base sheet such that at least one edge region of the polymeric base sheet extends outside of at least one of the first and second spacer layers.

15. The distribution cabling tape system of claim 14, wherein the adhesive layer covers the first major surface of the polymeric base sheet.

16. The distribution cabling tape system of claim 15, wherein the adhesive layer comprises a pressure sensitive adhesive having a thickness of 3 to 10 mil.

17. The distribution cabling tape system of claim 1, wherein the second adhesive layer disposed on the first and second spacer layers comprises a pressure sensitive adhesive.

18. The distribution cabling tape system of claim 17, wherein the first and second spacer layers and polymeric base sheet are formed from the same material.

* * * * *